UNITED STATES PATENT OFFICE.

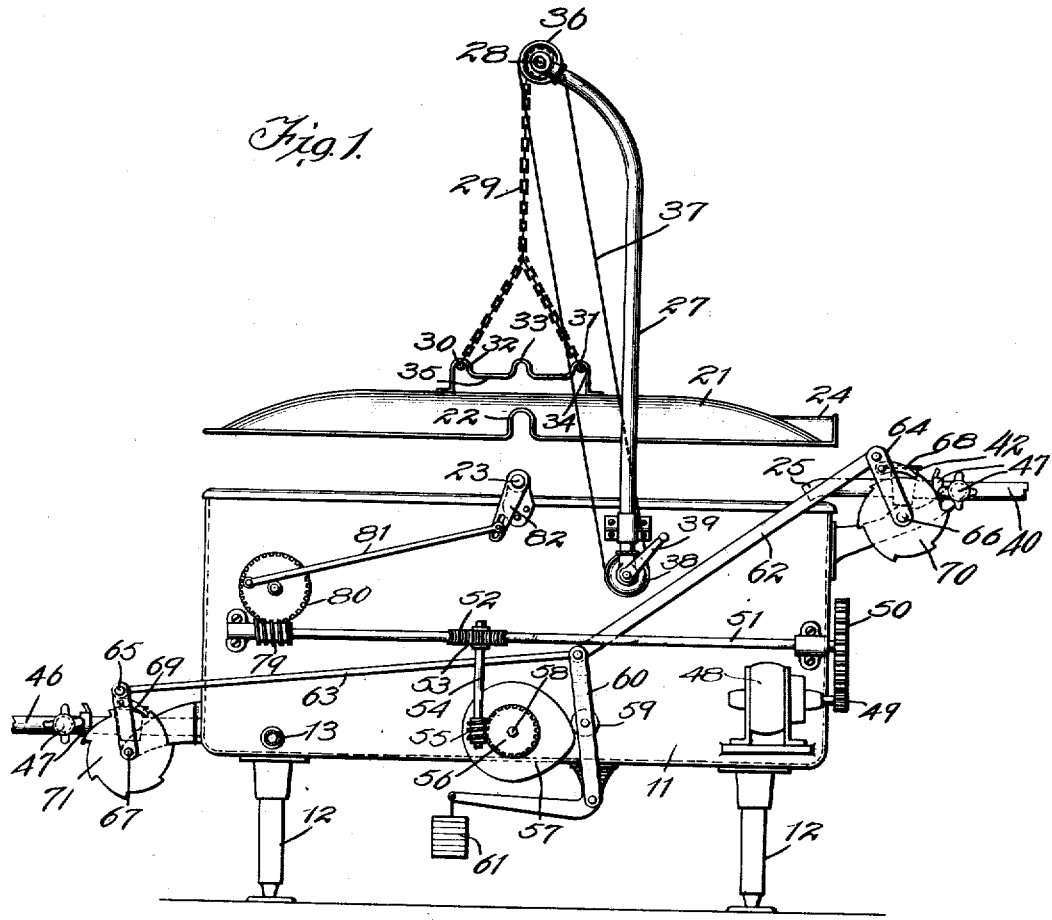

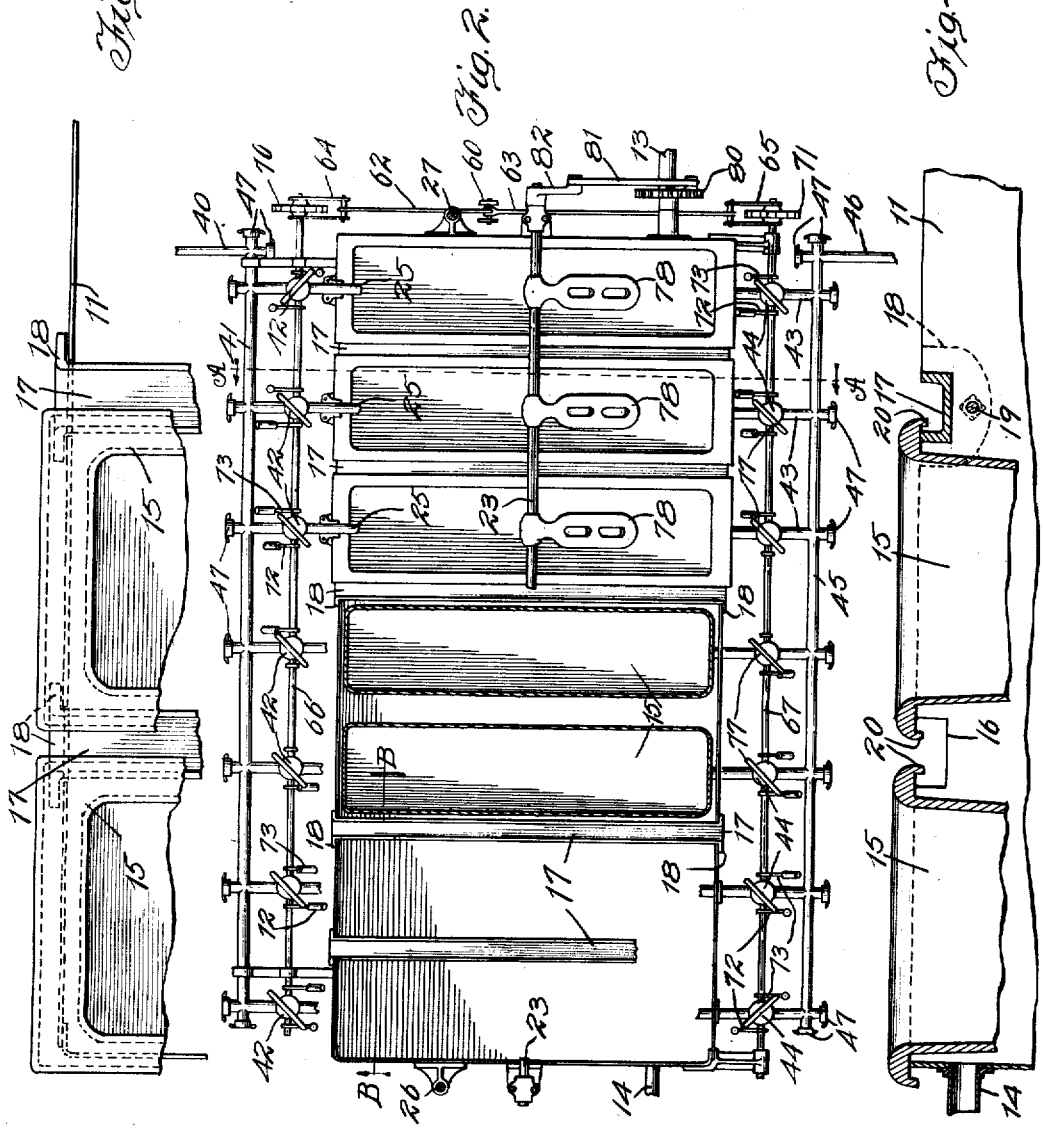

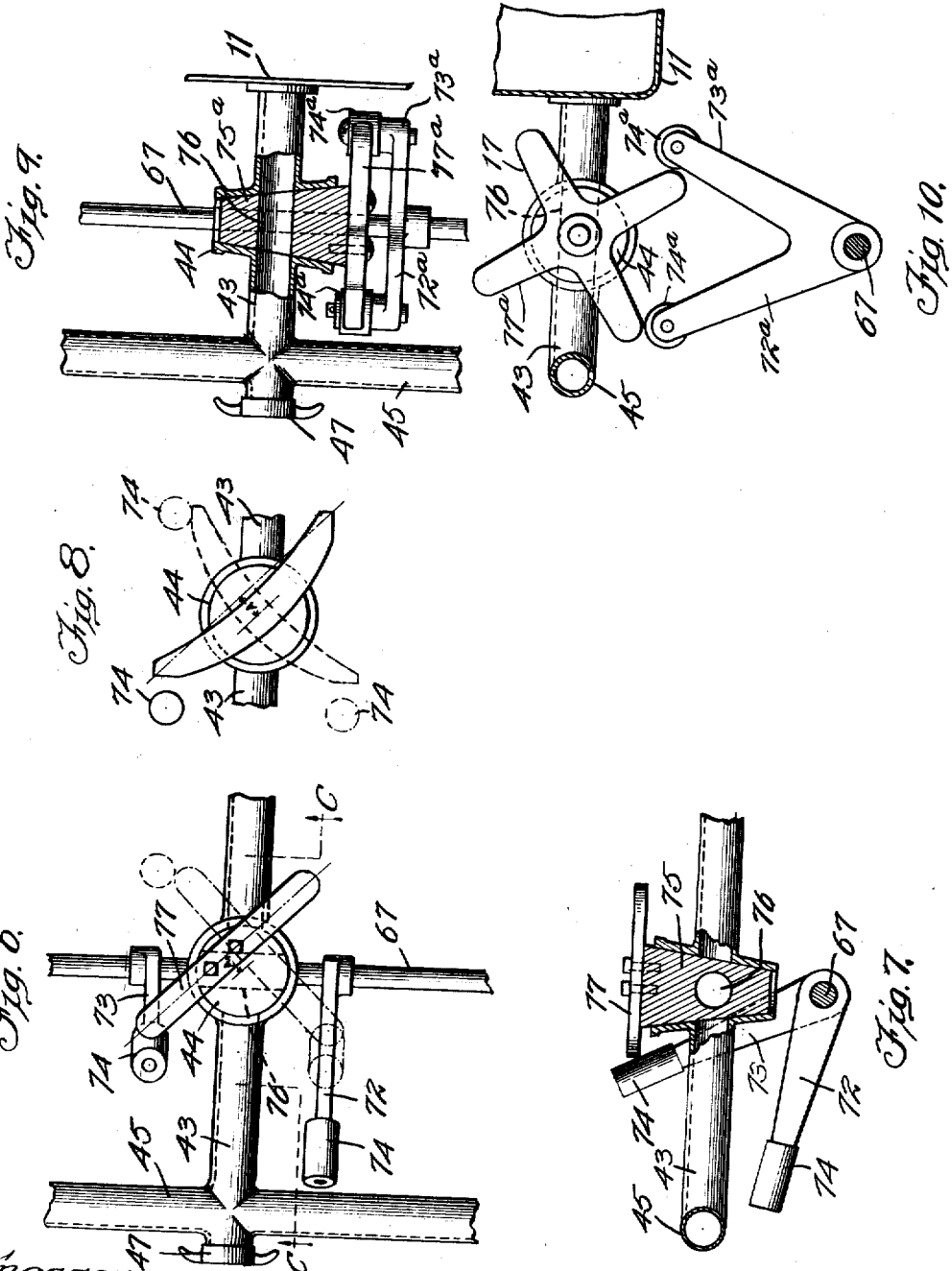

WILLIAM J. DAVIS, OF CHICAGO, ILLINOIS.

PASTEURIZING APPARATUS.

1,107,765.   Specification of Letters Patent.   Patented Aug. 18, 1914.

Application filed August 22, 1912. Serial No. 716,374.

*To all whom it may concern:*

Be it known that I, WILLIAM J. DAVIS, a citizen of the United States, and a resident of Chicago, in the county of Cook and State of Illinois, have invented certain new and useful Improvements in Pasteurizing Apparatus, of which the following is a full, clear, and exact specification.

My invention is concerned with apparatus for pasteurizing milk, beer, etc., and more especially with automatic apparatus by which the milk, beer, etc., when raised to the pasteurizing temperature can be held at that temperature for the desired length of time to insure the destruction of germs in the milk, etc., being treated.

It is concerned with a device of the class described that shall be provided with means for automatically keeping the milk in motion during this holding step, so as to prevent possible separation of the butter fat from the milk.

It is further concerned with a device of the class described that shall be provided with means for maintaining the milk at the desired temperature.

It is further concerned with a construction wherein the valve mechanism controlling the movement of the milk to and from the vats shall be simple in its construction and of a character that can be readily cleaned when necessary.

It is also concerned with certain other features that will be fully described in the specification, and particularly pointed out in the claims.

To illustrate my invention I annex hereto three sheets of drawings, in which the same reference characters are used to designate identical parts in all the figures, of which:

Figure 1 is a side elevation of the apparatus; Fig. 2 is a top plan view partly in section, and with some of the vats removed; Fig. 3 is a detail in section through the tank and one of the vats as if in section on the line A—A of Fig. 2; Fig. 4 is a detail in section as if on line B—B of Fig. 2; Fig. 5 is a top plan view on the same scale of one corner of the tank and vats; Fig. 6 is a detail in top plan view showing one form of the automatically operated valves which I preferably employ; Fig. 7 is a similar view as if in section on the line C—C of Fig. 6; Fig. 8 is a view similar to Fig. 6 showing a slight modification; Fig. 9 is a plan view partly in section through the valve proper showing another modification; and Fig. 10 is a side elevation of the construction shown in Fig. 9.

In carrying out my invention in its preferred form, I employ hot water as the fluid for keeping the liquid to be treated at the pasteurizing temperature, although it will be understood that I contemplate employing other fluids, or the electric current may be employed for this purpose. Where a liquid, such as water is employed, it is held in a tank 11 which is preferably of a generally rectangular shape and may be mounted upon legs 12 of which there will ordinarily be one at each corner. This tank is preferably constructed of metallic plates suitably connected to form a water tight receptacle into which the hot water may be introduced at any point, as for instance through the pipe 13 at the lower side of one end thereof, and the overflow of water therefrom may escape through the pipe 14 located diagonally from the pipe 13, as I preferably employ the method of supplying the desired amount of water to keep the milk at the desired temperature shown in my application for a Patent No. 716,373, filed August 22, 1912.

Suitably supported in the tank from the top thereof is a series of vats 15, which are preferably made of iron suitably enameled on the interior and finished without any corners upon the interior so that they can be readily cleansed. To support these vats in place, I preferably employ the construction shown, wherein it will be seen that the front and rear upper edges of the tank 11 have the rectangular recesses 16 therein, which are adapted to receive the channel bars 17, having the flaring ends 18, by which said bars may be permanently secured in place by the rod 19 passing through said flaring portions and the sides of the tank. The vats 15 have the overhanging flange 20 adapted to extend into the channel 17 in the manner clearly shown in Fig. 4. This method of mounting the vats in the tank serves to support them in a manner in which all parts are readily accessible for cleansing, and in case of an accidental overflow of any of the vats, the overflowing contents will be discharged upon the floor and not in any adjacent vat.

I preferably cover the entire series of vats, of which I have, for example, shown seven, by a series of sheet metal covers 21, which are of the proper shape to fit over the tops of the vats and cover them, each of these covers being provided with a pair of off-set portions 22 to accommodate the rock shaft 23, and with the off-set portion 24 to accommodate the spout 25. In order to lift all these covers simultaneously I preferably employ a pair of standards 26 and 27, the standard 27 being shown in Fig. 1, while the corresponding standard 26 is of the same shape and located at the other end, and in the upper ends of these standards I journal the drum shaft 28 upon which is adapted to be mounted two or more ropes or chains 29, the lower ends of which are preferably divided so as to be connected to two separate rods 30 and 31, which rods coöperate with the recesses 32, 33 and 34 formed in the bail 35 secured on the top of each of the covers 21. On one end of the shaft 28, I secure a sprocket wheel 36, which is connected by the sprocket chain 37, with a sprocket wheel 38, journaled on a suitable bearing supported from the side of the tank 11, and provided with the handle 39, by which it may be turned so that the shaft 28 can be rotated in the proper direction to raise or lower simultaneously all the covers 21. If it is desired to raise the covers in a horizontal position, as shown in Fig. 1, the rods 30 and 31 coöperate with the recesses 32 and 34. If it is desired to lift the forward end of the cover first, the rod 31 will be placed in the recesses 33 of the bails 35, and with this arrangement it will be obvious that the forward end of the covers will be lifted first and that they will finally hang in an inclined position.

The milk to be treated comes from the pasteurizer through the pipe 40, which is connected with the horizontal pipe 41 extending substantially the length of the tank at the rear thereof, and at the proper height so that the spouts 25 connected therewith may extend over the upper rear edges of the vats 15 in the manner clearly shown in Fig. 3, so that when the valve 42 in the spout 25 is turned in the proper direction, the milk will flow into the vat. The lower forward ends of the tanks 15 have secured thereto and projecting therefrom through the front wall of the tank 11 the discharge spouts 43, each of which has a valve 44 like the valve 42. The forward end of each of these discharge spouts is connected to the discharge pipe 45, which will have one end thereof connected with the pipe 46 leading to the coolers employed to chill the milk after the pasteurization has been completed. It will be noted that these spouts 25 and 43, and the pipes 40, 41, 45 and 46 have their ends closed by removable screw caps 47 so that the interiors of said pipes can be readily scrubbed, and it will be noted from Figs. 6 to 10 that the valves 42 and 44 located in the spouts are of a construction that can be readily removed and cleaned, it being of vital importance in constructions of this character that all the parts can be thoroughly cleansed and sterilized after each operation to insure that the milk shall not be contaminated by the apparatus itself. To operate these valves 42 and 44 automatically at the proper time, I may employ any suitable motive power, such as the motor 48, suitably supported at one end of the tank and having the pinion 49 on its armature shaft gearing with the spur gear wheel 50 secured on the horizontal shaft 51, suitably journaled in bearings on the end of the tank. This shaft 51 carries at the central portion thereof the worm 52, which meshes with the worm gear wheel 53, secured on the shaft 54, suitably journaled in bearings carried on the end of the tank 11, and having secured at its lower end the worm 55, which meshes with the worm wheel 56 rigidly secured to the cam 57, the worm wheel and cam being suitably journaled on the stud shaft 58, supported from the end of the tank 11. This cam 57 coöperates with the anti-friction roller 59 journaled on the bell crank lever 60, the horizontal arm of which supports the weight 61, to hold the lever and the roller 59 against the cam, while the vertical arm is connected by the links 62 and 63 with the arms 64 and 65 journaled on the ends of the rock shafts 66 and 67, which rock shafts are journaled in suitable bearings supported from the front and rear sides of the tank. The levers 64 and 65 carry the pawls 68 and 69 which coöperate with the ratchet wheels 70 and 71 rigidly secured on the shafts 66 and 67 respectively, so that at each rotation of the cam disk 67, the ratchet wheels 70 and 71, and the attached shafts 66 and 67 will be turned through one-seventh of a complete revolution.

In the preferred construction shown in Figs. 6, 7 and 8, the shafts 66 and 67 are each provided with seven pairs of arms 72 and 73, these arms being provided on their outer ends with anti-friction rollers 74, and being located in certain angular relationship on their shafts so as to carry out the operation to be described. The valves 42 and 44 have the conical bodies 75 with the passage 76 therethrough adapted in one position to register with the passage through the spouts and in the other position to be 90 degrees from registration, so as to shut off the flow through the spouts. Secured on the upper end of the valve body 75 is an arm 77 which may be eccentrically located as shown in Fig. 6, or which may have the curved form shown in Fig. 8, so that as the shaft 67 rotates in the direction indicated by the arrow in Fig. 6, the roller on the arm 73 will strike one end of the arm 77 and swing it from the full line to the dotted line position. In this movement, the valve will be opened, and the milk from the pasteurizer will be allowed to flow into the vat associated with that valve until the next revolution of the cam 57, when the anti-friction roller on the arm 72 will strike the other end of the arm 77 and swing the arm and the attached valve back to the full line closed position, thus closing the valve and preventing any further flow of milk into that particular vat. The arms 72 and 73 on the shafts 66 and 67 are so arranged that if we take the vats at one end, as at the left hand end of Fig. 2, the valve 44 for that vat will be open, while the cocks 44 for the other vats will all be closed. At the same time, the cock 42 for the right hand vat will be open, and the cocks 42 for the other vats will be closed. With this condition, it will be seen that while the cam 57 is making one rotation, the milk will be flowing from the left hand vat and flowing into the right hand vat. while the five intermediate vats will be filled with milk and there will be no movement of the milk into or from any of said five intermediate vats. At the next operation, the valves will be turned so that the valve 44 of the left hand vat will be closed, and the valve 42 of the same vat opened so that said vat will be filled during the next interval. The valve 44 of the next to the left hand vat will be opened, and it will be emptying during this next period. The valve 42 of the right hand vat will be closed and the milk will stand in this right hand vat as well as in the four intermediate vats. From the foregoing, it will be seen therefore that if the parts are geared up so as to take five minutes for the rotation of the cam 57, each vat will have the milk held therein during a period of thirty minutes, which is the proper length of time to effect the pasteurization at a certain temperature, under which the system is designed to operate.

In Figs. 9 and 10, I have illustrated a modification of the valve actuating mechanism, in which the valve body 75ª is set horizontally instead of vertically, and is arranged to be advanced continuously in the same direction instead of being reciprocated as in the construction shown in Figs. 6 to 8. With this form, instead of the arms 77, I secure on the shafts 66 and 67 a four-armed star wheel 77ª, and instead of having the two separated arms 72 and 73 in different planes, I have the arms 72ª and 73ª located in the same plane, and preferably rigidly secured to or integral with each other at their lower ends, and the anti-friction rollers 74ª which terminate these arms will coöperate with the arms of the star wheel 77ª so as to first open the cock by moving it through 90 degrees and then close it by moving it through another 90 degrees in the same direction.

In carrying out the novel process of pasteurization described in my aforesaid application, No. 716,373, filed August 22, 1912, I agitate the milk during the entire holding period to prevent possible rising of the butter fat, and for this purpose I employ in the specific mechanism shown the rock shaft 23, journaled in suitable bearings, secured on the end of the tank, and having the paddles or stirrers 78 rigidly secured thereon, and extending down into the bodies of the vats. To rock this shaft 23 at a suitable speed and thus secure the constant but not violent agitation of the milk, I provide on the end of the shaft 51 a worm 79 which meshes with the worm wheel 80 suitably journaled upon a stud shaft projecting from the end of the tank 11, and a link 81 connects an eccentric pin on the worm wheel 80 with the slotted arm 82 secured on the rock shaft 23. By the connection shown, the motor 48 will serve not only to operate the valves 42 and 44 automatically at the proper time, but also to keep the paddles 78 in constant motion.

While I have shown and described my invention as embodied in the form which I at present consider best adapted to carry out its purposes, it will be understood that it is capable of modification, and that I do not desire to be limited in the interpretation of the following claims except as, may be necessitated by the state of the prior art.

What I claim as new, and desire to secure by Letters of the United States is:

1. In a device of the class described, the combination with a single tank containing a heating fluid, of a plurality of holding vats mounted therein, having their flat vertical sides adjacent each other and the walls of the tank, a corresponding plurality of valves controlling the admission and discharge of the treated fluid to and from each of said vats, and automatic mechanism for operating the supply and discharge valves of the various vats *seriatim*, so that one vat will be emptying while another is filling, and so that the fluid will remain in each vat a certain period of time.

2. In a device of the class described, the combination with a plurality of holding vats, of a corresponding plurality of valves controlling the admission and discharge of the treated fluid to and from each of said vats, automatic mechanism for operating the supply and discharge valves of the various vats, so that one vat will be emptying while another is filling, and so that the fluid will remain in each vat a certain period of time after the completion of the filling and before the beginning of the emptying, a corresponding plurality of stirring members, one extending to each vat, and a single operating mechanism for the stirring members, acting through them constantly to stir gently the fluid in the vats.

3. In a device of the class described, the combination with a plurality of vats, of a rock shaft carrying a plurality of stirrers, one for each vat, a plurality of cocks controlling admission of the liquid to be treated to the vats and its discharge therefrom, and automatic mechanism for rocking said shaft and operating said valves, so that one vat will be emptying while another is filling, and so that the fluid will remain in each vat a certain period of time.

4. In a device of the class described, the combination with a plurality of vats, of a rock shaft carrying a plurality of stirrers, one for each vat, a plurality of cocks controlling admission of the liquid to be treated to the vats and its discharge therefrom, a pair of shafts controlling the movement of the cocks, and automatic mechanism for rocking said rock shafts and operating the other shaft at intervals, so that one vat will be emptying while another is filling, and so that the fluid will remain in each vat a certain period of time.

5. In a device of the class described, the combination with a plurality of vats, of a rock shaft carrying a plurality of stirrers, one for each vat, a rotary shaft, means for rotating said shaft, a worm on said shaft, a worm wheel meshing therewith, an eccentric pin thereon, an arm on the rock shaft, and a link connecting said pin and arm.

6. In a device of the class described, the combination with a series of rectangular holding vats placed side by side, of a rectangular tank adapted to be filled with a heating medium and inclosing said holding vats surrounded with a heating medium; straight inlet and outlet pipes extending transversely of and each having an opening connected to each of said holding vats, valves in each connection between said pipes and holding vats, and mechanism by which each valve in each pipe may be successively opened and by which an inlet pipe in each holding vat will be opened and the outlet valve from the same vat will be closed simultaneously.

7. In a device of the class described, the combination of a tank, with a number of holding vats therein, means for surrounding said holding vats with a heating medium, a mechanism for successively filling said holding vats and for successively emptying the same after the liquid treated therein has been held for the desired period after the completion of the filling and before beginning the emptying, and means for keeping the liquid in said holding vats in constant motion during the holding period, said means consisting of a stirring member for each vat, and a common driving member for actuating all of said stirring members.

8. In a device of the class described, the combination with a tank, of a plurality of holding vats therein, means for surrounding said holding vats with a heating medium, an inlet pipe with valves connected therewith by which said holding vats may be successively filled with the liquid to be held therein, an outlet pipe with valves connected therewith by which the liquid so held in said holding vats may be successively discharged therefrom after it has been held therein for a certain length of time after the completion of the filling operation, agitators in each of said holding vats by which the liquid therein may be kept in motion while being so held, and a single driving mechanism by which said valves connected with said inlet and outlet pipes are operated and the said agitators are actuated.

9. In a device of the class described, the combination with a plurality of holding vats, of inlet and outlet valves from each of said holding vats, a mechanism by which said valves may be severally and successively opened and closed at stated periods, straight inlet and outlet pipes extending transversely of the vats having removable caps for their ends, and straight connecting pipes in which said valves are located extending from the inlet and outlet pipes to the vats and provided with removable caps at their outer ends.

10. In a device of the class described, the combination with a plurality of holding vats, of straight inlet and outlet pipes extending transversely of the vats and having removable caps for their ends, straight connecting pipes with removable caps at their outer ends, inlet and outlet pipes to the vats and provided with removable caps at their outer ends, inlet and outlet valves for each of said holding vats removably mounted in the straight connecting pipes, and mechanism by which said valves may be severally and successively opened and closed at stated periods.

11. In a device of the class described, the combination with a plurality of holding vats, of straight inlet and outlet pipes extending transversely of the vats, connecting pipes from the inlet and outlet pipes to the vats, inlet and outlet valves for each of said holding vats located in said connecting pipes and arranged in a line transversely to the vats, fingers on said valves, a shaft extending parallel to the valves and provided with actuating members to engage the fingers, whereby said valves may be severally and successively opened and closed at stated periods, and means for rotating the shaft at intervals.

In witness whereof I have hereunto set my hand and affixed my seal, this 19th day of August, A. D. 1912.

WILLIAM J. DAVIS. [L. S.]

Witnesses:
 JOHN HOWARD MCELROY,
 MILDRED ELSNER.

It is hereby certified that in Letters Patent No. 1,107,765, granted August 18, 1914, upon the application of William J. Davis, of Chicago, Illinois, for an improvement in "Pasteurizing Apparatus," an error appears in the printed specification requiring correction as follows: Page 4, after line 111, insert the syllables and words *necting pipes extending from the inlet and outlet pipes to the vats and provided with;* and that the said Letters Patent should be read with this correction therein that the same may conform to the record of the case in the Patent Office.

Signed and sealed this 22nd day of September, A. D., 1914.

[SEAL.] R. F. WHITEHEAD,

*Acting Commissioner of Patents.*